United States Patent Office 3,361,567
Patented Jan. 2, 1968

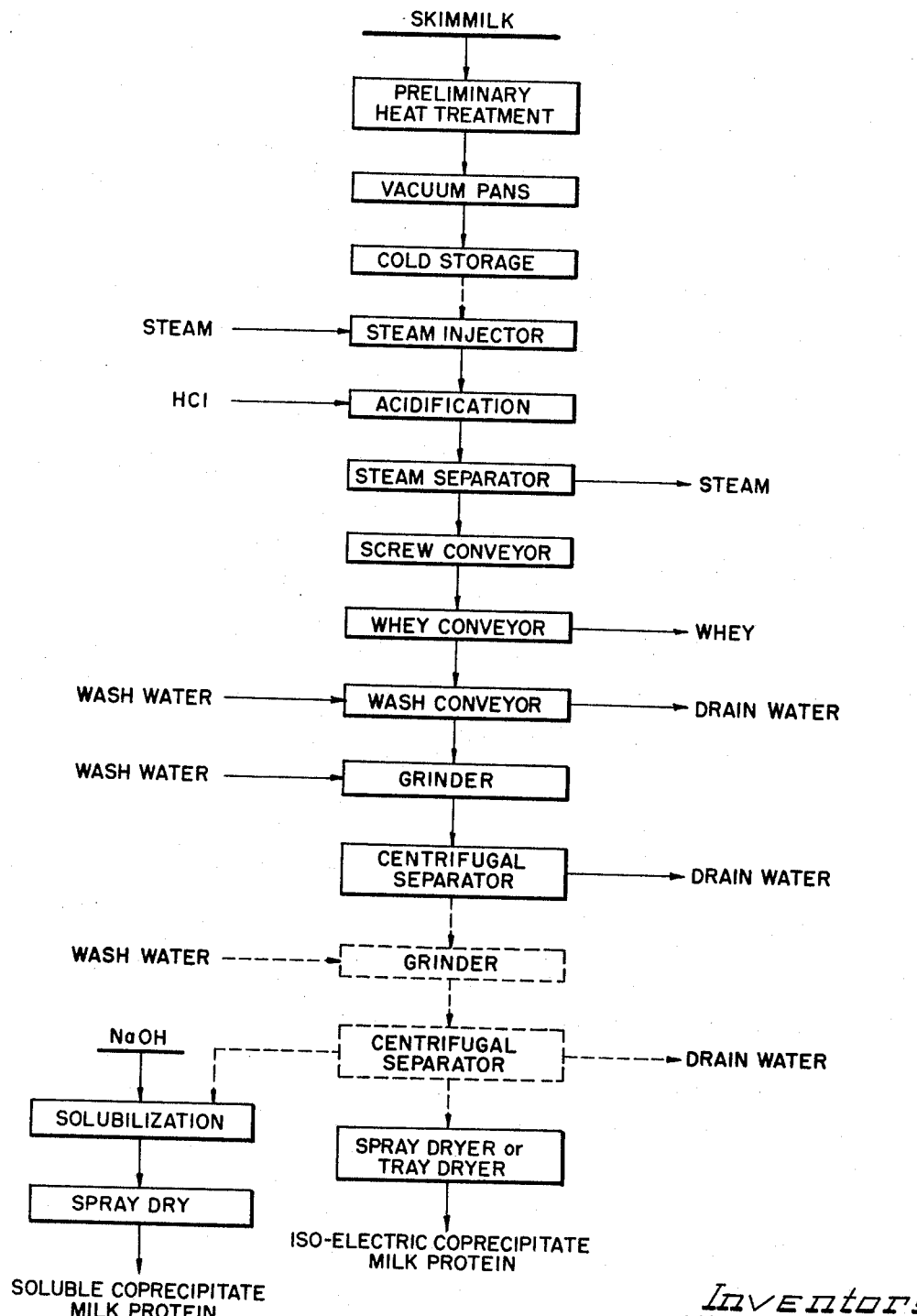

3,361,567
PROCESS FOR THE MANUFACTURE
OF CASEIN
Martin E. Engel, Park Ridge, and Andrew D. Singleton, Northfield, Ill., assignors to National Dairy Products Corporation, New York, N.Y., a corporation of Delaware
Filed Dec. 21, 1964, Ser. No. 419,930
10 Claims. (Cl. 99—20)

ABSTRACT OF THE DISCLOSURE

A process for the manufacture of milk protein wherein skim milk is first subjected to a preliminary heat treatment at a temperature of above about 180° F., for at least 10 minutes or for correspondingly diminished times at higher temperatures not to exceed about 210° F. The solids in the skim milk are then increased so as to provide at least ten percent solids. Thereafter the high solids skim milk is subjected to an ultra high temperature-short time treating condition of at least 280° F. for 15 seconds. The treated skim milk is then reduced in temperature and is acidified by the addition of an acid under turbulent conditions to provide curd and whey. The curd and whey are then separated and the curd may be ground in the presence of added water to a small particle size.

---

The present invention relates generally to the manufacture of milk protein and, more particularly, it relates to a continuous process for recovering milk protein.

Casein, a protein, has been recovered from milk for many years and this has been accomplished by developing the acidity in milk to a point where the casein is coagulated and thereafter separated from whey. The acidification may be effected by the addition of mineral or organic acids and may also be effected by bacterial development.

Unless the milk is specially treated, mere acidification of the milk will cause coagulation of casein, but will not cause precipitation of certain other proteins, referred to herein as whey proteins, from the milk. Accordingly, this whey protein substantially remains with the whey and will not be precipitated with the coagulated casein.

A process for the manufacture of casein is disclosed in United States Letters Patent No. 2,044,282 to Clickner, dated June 16, 1936.

The recovery of whey protein with casein has been a desideratum over the years, and various attempts have been made to effect co-precipitation of casein and whey protein by treating the milk and by adding various materials to the milk. A method for effecting co-precipitation of casein and whey protein is set forth in United States Letters Patent No. 2,623,038 to Scott, dated Dec. 23, 1952. Another method is set forth in United States Letters Patent No. 2,665,989 to Howard et al., dated Jan. 12, 1954. A third process is disclosed in United States Letters Patent No. 2,750,374 to Howard et al., dated June 12, 1956.

Generally, the disclosed processes have not provided a coagulum or curd which can be readily handled in a continuous process and the disclosed processes require batch handling and processing of milk. The curd prepared from these disclosed processes is usually soft mush, or contains too many fines for satisfactory recovery except by uneconomical processes such as decantation or filtration. Furthermore these disclosed processes do not permit recovery of protein in high yield.

Accordingly, a particular object of this invention is the provision of an improved method for recovering milk protein. A more particular object of the invention is the provision of an improved process for co-precipitating casein and whey protein. A still further object of this invention is the provision of an improved process for co-precipitating casein and whey protein, which process provides a readily handleable curd, and which provides a whey that is ideally suited for lactose recovery therefrom. An additional object of the invention is the provision of an improved process for the continuous manufacture of milk protein and particularly a co-precipitate of casein and whey protein.

Further objects and advantages of this invention will become apparent by reference to the following description and accompanying drawing.

In the drawing, there is shown a flow sheet of an embodiment of this invention.

In accord with the present invention, the milk fat is first removed from milk to provide a skim milk. The skim milk is then subjected to a preliminary heat treatment. This preliminary heat treatment should comprise heating the skim milk to a temperature of about 180° F. for 10 minutes or more, or for correspondingly diminished times at higher temperatures not to exceed about 210° F. Over heating and/or high temperature treatment of the skim milk in the preliminary heat treatment should be avoided.

The solids of the skim milk should then be increased to at least 10 percent solids and preferably to 30 percent solids. However, the solids should not exceed about 35 percent solids because such high solids results in difficulty in curd formation. The increased solids may be effected by adding non-fat milk solids to the skim milk or by concentrating the skim milk in an evaporator.

The high solids skim milk should then be subjected to an ultra high temperature-short time treating condition (UHTST) and, in this connection, the high solids skim milk should be heated to at least 280° F. for 15 seconds and preferably, to 285 to 295° F. for 20 seconds. Of course, equivalent time and temperature conditions may be utilized for the ultra high temperature short time treatment.

The heat treated skim milk should then be reduced in temperature to a temperature of 210 to 215° F. and acidified by the addition of an acid under turbulent conditions so as to assure uniform distribution of the acid in the skim milk. The skim milk, after acid addition, forms into curd and whey with the whey protein co-precipitating with the casein to provide a handleable curd. Some compacting of the curd is desirable before further treatment. The curd and whey are then separated. The curd is preferably washed to free most of the lactose from the curd which, if present at substantial levels, results in browning of the product. The curd of the invention is in such condition that it can be continuously roll-pressed on a conveyor and simultaneously and subsequently washed without substantial loss of solids and with high recovery of milk protein.

The curd is then ground in the presence of added water to a very small particle size and the resultant dispersion of milk protein particles is centrifuged from the aqueous phase. If desired, further addition of water, grinding and centrifugation may be employed to further purify the milk protein.

The milk protein is then ready for drying or further processing. In this connection, the protein may be dried in a tray dryer or it may be formed into a slurry and spray dried. Alternatively, a soluble milk protein may be prepared by dissolving the milk protein in sodium hydroxide in accord with known procedures. The solubilized milk protein can then be spray dried.

It has been found that the preliminary heat treatment, prior to the ultra high temperature-short time treatment, is necessary for the achievement of a satisfactory curd for continuous processing. We have also found it to be important for obtaining such curd that acidification be effected while the high solids skim milk is at a high temperature. These conditions, in conjunction with the ultra high temperature-short time treatment of the milk and concentration of the milk provide milk protein in high yield with the casein and whey protein being co-precipitated. The process of the invention provides readily handleable curd which can be processed continuously in a plant.

As an example of the invention and with reference to the flow sheet, skim milk was subjected to a preliminary heat treatment by heating it to 185° F. for 20 minutes. This preconditions the skim milk for subsequent heat treatment. The milk was then fed to vacuum pans and concentrated to a solids content of 30 percent. In the flow sheet, the milk is shown to go next to cold storage, but this step is not necessary to the process of the invention.

The concentrated skim milk was passed into a steam injector for ultra high temperature-short time treatment. The milk was raised in temperature to 290° F., held at such temperature for 20 seconds, and discharged to about atmospheric pressure conditions from the steam injector so that the milk was promptly cooled to about 212° F. by flashing.

Flashing of the heat treated milk was effected in a 1-inch sanitary pipe which included a U-shaped portion thereby effecting a high degree of turbulence. While in this turbulent condition and while at the elevated temperature, a pre-selected quantity of 11 percent hydrochloric acid was added to the milk. The high degree of turbulence effects uniform distribution of the acid throughout the heat treated skim milk without localized high acid conditions.

Upon mixing of the acid and the heat treated skim milk, casein and whey protein were co-precipitated to provide a mixture of co-precipitate curd, steam, and whey. Desirably, before attempting to separate the curd from the remaining constituents, the entire mixture is conducted into a separator, wherein liquid and vapor constituents are segregated. In the separator, steam was separated from the curd and whey with the curd and whey passing out the bottom of the separator and steam being recovered from the top of the separator.

The steam separator comprised a vertical, open ended 3-inch pipe, about 1 foot in length, and the mixture of curd, whey and flashing steam entered mid-point of the pipe. The mixture was directed tangentially into the pipe causing the curd and whey to spiral downwardly and the steam to escape from the top of the pipe.

The curd and whey were passed into a hopper which fed a screw conveyor and which held the curd for a short period of time. During this hold period of about 10 seconds final precipitation of the milk protein occurred. The screw conveyor operated to physically agglomerate and compact the curd, which came out of the screw conveyor in the form of a rice-like granule.

The curd and whey were discharged from the screw conveyor onto a whey separator which comprised a riffle bottom trough, the trough being provided with a 40 mesh screen on its bottom. The removed whey had a pH of between about 4.5 and about 4.8 which is equivalent to a whey acidity of .6 to .8 percent measured in equivalent lactic acid level. The amount and concentration of acid added to the hot skim milk was selected to provide this pH level in the whey.

The curd discharged from the riffle bottom trough had a solids content of about 25 percent and was fed onto an upwardly moving wash conveyor. The wash conveyor comprised a continuous belt over which were located a plurality of pressure rolls. A first roll was adjusted so as not to provide excessive pressure and to avoid compacting the curd into an impenetrable cake. The curd on the belt was washed with water so as to promptly cool the curd to about 90° F. Such prompt cooling is necessary to avoid undue browning of the milk protein. The curd was then washed again with water and pressed by a second roll on the continuous conveyor so as to substantially reduce the lactose level in the curd.

As illustrated in the drawing, the curd from the wash conveyor was conducted to a grinder wherein water was also added, and the curd was ground in a Morehouse mill to provide a fine dispersion of milk protein in water. The dispersion was then passed to a centrifugal separator where the milk protein was separated from the water. At this point, the protein comprised less than about 1 percent lactose.

Optionally, as shown in dotted outline in the drawing, the milk protein may again be ground with added water to further reduce its lactose content, and centrifugally separated from the water.

As shown in the flow sheet, the resultant milk protein can be placed on a tray and dried. Alternately, it can be slurried in water and fed to a spray dryer. As an additional alternative, and as shown in the flow sheet, the milk protein slurry can be solubilized by the addition of sufficient sodium hydroxide to provide a pH of about 7.0, and then the resulting solution spray dried to provide a soluble milk protein.

It has been found that a preliminary heat treatment at about 165° F. for about 5 minutes, followed by concentration and heat treatment at 285° F. for about 20 seconds does not give adequate harvestability to the milk protein. It also has been found that a preliminary heat treatment at about 185° F. for about 20 minutes, followed by concentration and heat treatment at temperatures less than about 280° F. does not give adequate harvestability. It has been found further that if the acid is not added at the high temperature, a satisfactory curd does not result.

The product of this invention has been made into bread and has been found to give excellent results. In addition, the milk protein has a number of other uses and can be sold as a standard item of commerce for the many uses for which milk protein is presently marketed.

In this connection, the product of the present invention has improved nutritional characteristics in comparison with a protein containing casein alone. This was demonstrated in a standard feeding test by feeding the product of the invention to rats and comparing their weight gain with the weight gain of rats which were fed a control diet comprising a commercially available casein. The weight gains per gram of protein consumed were tabulated as protein efficiency ratio, with a higher ratio indicating a higher nutritional value. The control casein resulted in a protein efficiency ratio of 2.50, whereas the product of the invention resulted in a protein efficiency ratio of 3.25.

Various features of the invention, which are believed to be new, are set forth in the following claims.

What is claimed is:

1. A process for the manufacture of milk protein comprising the steps of subjecting skim milk to a preliminary heat treatment at temperatures between about 180° F. and 210° F. for at least about 10 minutes at the lower temperature and correspondingly diminished periods thereabove, increasing the solids contents of the skim milk to at least 10 percent solids, subjecting the concentrated milk to ultra high temperature-short time treatment, said ultra high temperature-short time treatment being effected at a temperature above about 280° F., acidifying said milk at a temperature of at least about 210° F. to form curd and whey, and separating the curd from the whey.

2. A process for the manufacture of milk protein comprising the steps of subjecting skim milk to a preliminary heat at temperatures between about 180° F. and 210° F. for at least about 10 minutes at the lower temperature and correspondingly diminished periods thereabove, increasing the solids contents of tht skim milk to from about 10 percent solids to about 35 percent solids, subjecting the concentrated milk to ultra high temperature-short time treatment, said ultra high temperature-short treatment being effected at a temperature above about 280° F., acidifying said milk at a temperature of at least about 210° F. to form curd and whey, and separating the curd from the whey.

3. A process for the manufacture of milk protein comprising the steps of subjecting skim milk to a preliminary heat treatment at temperatures between about 180° F. and 210° F. for at least about 10 minutes at the lower temperature and correspondingly diminished periods thereabove, increasing the solids contents of the skim milk to from about 10 percent solids to about 35 percent solids, subjecting the concentrated milk to ultra high temperature-short time treatment by heating and holding the concentrated milk to a condition at least equivalent to 280° F. for 15 seconds, said equivalent conditions being for temperatures that are above 280° F., acidifying said milk at a temperature of at least about 210° F. to form curd and whey, and separating the curd from the whey.

4. A process for the manufacture of milk protein comprising the steps of subjecting skim milk to a preliminary heat treatment at temperatures between about 180° F. and 210° F. for at least about 10 minutes at the lower temperature and correspondingly diminished periods thereabove, increasing the solids content of the skim milk to at least 10 percent solids, subjecting the concentrated milk to ultra high temperature-short time treatment, said ultra high temperature-short time treatment being effected at a temperature above about 280° F., acidifying said milk at a temperature between about 210° F. and 215° F. to form curd and whey, and separating the curd from the whey.

5. A process for the manufacture of milk protein comprising the steps of subjecting skim milk to a preliminary heat treatment at temperatures between about 180° F. and 210° F. for at least about 10 minutes at the lower temperature and correspondingly diminished periods thereabove, increasing the solids content of the skim milk to at least 10 percent solids, subjecting the concentrated milk to ultra high temperature-short time treatment, said ultra high temperature-short time treatment being effected at a temperature above about 280° F., acidifying said milk at a temperature of at least about 210° F. to form curd and whey, compacting the curd, separating the curd from the whey, and washing the curd.

6. A process for the manufacture of milk protein comprising the steps of subjecting skim milk to a preliminary heat treatment at temperatures between about 180° F. and 210° F. for at least about 10 minutes at the lower temperature and correspondingly diminished periods thereabove, increasing the solids content of the skim milk to about 30 percent solids, subjecting the concentrated milk to ultra high temperature-short time treatment, said ultra high temperature-short time treatment being effected at a temperature above about 280° F., acidifying said milk at a temperature between about 210° F. and 215° F. to form curd and whey, and separating the curd from the whey.

7. A process for the manufacture of milk protein comprising the steps of subjecting skim milk to a preliminary heat treatment at temperatures between about 180° F. and 210° F. for at least about 10 minutes at the lower temperature and correspondingly diminished periods thereabove, increasing the solids content of the skim milk to from about 10 percent solids to about 35 percent solids, subjecting the concentrated milk to ultra high temperature-short time treatment by heating and holding the concentrated milk to a condition at least equivalent to between 285° F. and 295° F. for 20 seconds, said equivalent conditions being for temperatures that are above 280° F., acidifying said milk at a temperature of at least about 210° F. to form curd and whey and separating the curd from the whey.

8. A process for the manufacture of milk protein comprising the steps of subjecting skim milk to a preliminary heat treatment at temperatures between about 180° F. and 210° F. for at least about 10 minutes at the lower temperature and correspondingly diminished periods thereabove, increasing the solids content of the skim milk to about 30 percent solids, subjecting the concentrated milk to ultra high temperature-short time treatment, said ultra high temperature-short time treatment being effected at a temperature above about 280° F., acidifying said milk at a temperature between about 210° F. and 215° F. to form curd and whey, separating the curd from the whey, grinding the curd, washing the curd, and drying the curd to provide co-precipitate milk protein.

9. A process for the manufacture of milk protein comprising the steps of subjecting skim milk to a preliminary heat treatment at temperatures between about 180° F. and 210° F. for at least about 10 minutes at the lower temperature and correspondingly diminished periods thereabove, increasing the solids content of the skim milk to about 30 percent solids, subjecting the concentrated milk to ultra high temperature-short time treatment, said ultra high temperature-short time treatment being effected at a temperature above about 280° F., acidifying said milk at a temperature between about 210° F. and 215° F. to form curd and whey, separating the curd from the whey, grinding the curd, washing the curd, solubilizing the washed curd with alkali, and dehydrating the resultant dispersion to provide dispersible co-precipitate milk protein.

10. A continuous process for the manufacture of milk protein comprising the steps of subjecting skim milk to a preliminary heat treatment at temperatures between about 180° F. and 210° F. for at least about 10 minutes at the lower temperature and correspondingly diminished periods thereabove, increasing the solids content of the skim milk to at least 10 percent solids, subjecting the concentrated milk to ultra high temperature-short time treatment, said ultra high temperature-short time treatment being effected at a temperature above about 280° F., acidifying said milk at a temperature of at least about 210° F. to form curd and whey, and separating the curd from the whey.

References Cited

UNITED STATES PATENTS 3,128,192  4/1964  Vakaleris _____ 99—116

A. LOUIS MONACELL, *Primary Examiner.*

S. E. HEYMAN, *Assistant Examiner.*